US009967067B2

(12) United States Patent
Madan et al.

(10) Patent No.: US 9,967,067 B2
(45) Date of Patent: May 8, 2018

(54) SERVING NOISE/MACRO INTERFERENCE LIMITED USER EQUIPMENT FOR DOWNLINK INTER-CELL INTERFERENCE COORDINATION

(71) Applicant: CISCO TECHNOLOGY, INC., San Jose, CA (US)

(72) Inventors: Ritesh K. Madan, Berkeley, CA (US); Rohit Umesh Nabar, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 308 days.

(21) Appl. No.: 14/848,026

(22) Filed: Sep. 8, 2015

(65) Prior Publication Data
US 2017/0070323 A1 Mar. 9, 2017

(51) Int. Cl.
*H04L 5/00* (2006.01)
*H04B 1/10* (2006.01)
(Continued)

(52) U.S. Cl.
CPC ............ *H04L 5/0037* (2013.01); *H04B 1/10* (2013.01); *H04J 11/005* (2013.01);
(Continued)

(58) Field of Classification Search
CPC ... H04L 5/0037; H04L 5/0032; H04L 5/0073; H04B 1/10; H04J 11/005; H04W 52/04
See application file for complete search history.

(56) References Cited

U.S. PATENT DOCUMENTS 6,141,565 A 10/2000 Feuerstein et al.
6,600,924 B1 7/2003 Sinivaara
(Continued)

FOREIGN PATENT DOCUMENTS

EP 1322048 6/2003
EP 1718090 11/2006
(Continued)

OTHER PUBLICATIONS

EPO dated Nov. 21, 2016 Extended Search Report and Written Opinion from European Application Serial No. 16180195.6; 9 pages.
(Continued)

*Primary Examiner* — Ian N Moore
*Assistant Examiner* — Latresa McCallum
(74) *Attorney, Agent, or Firm* — Patterson + Sheridan, LLP

(57) ABSTRACT

An example method is provided in one example embodiment and includes receiving feedback information from at least one controlled cell indicative of interference received at one or more user equipment devices served by the at least one cell. The at least one controlled cell is controlled by an operator associated with the at least one controlled cell. The method further includes selecting one or more user equipment devices that is determined to have received interference from at least one non-controlled cell that is greater than a predetermined threshold. The at least one non-controlled cell is not controlled by the operator associated with the at least one controlled cell. The method still further includes determining a power level for a subset of common resources from among a set of common resources shared among the at least one controlled cell based upon the received feedback information.

28 Claims, 3 Drawing Sheets

(51) Int. Cl.
*H04J 11/00* (2006.01)
*H04W 52/04* (2009.01)

(52) U.S. Cl.
CPC ......... *H04L 5/0032* (2013.01); *H04L 5/0073* (2013.01); *H04W 52/04* (2013.01)

(56) References Cited

U.S. PATENT DOCUMENTS

| | | |
|---|---|---|
| 6,771,934 B2 | 8/2004 | Demers |
| 7,151,937 B2 | 12/2006 | Jin et al. |
| 7,379,739 B2 | 5/2008 | Rajkotia et al. |
| 7,884,763 B2 | 2/2011 | Na et al. |
| 7,974,652 B2 | 7/2011 | Gerlach |
| 7,983,667 B2 | 7/2011 | Hart et al. |
| 8,045,996 B2 | 10/2011 | Brunner et al. |
| 8,107,950 B2 | 1/2012 | Amerijoo et al. |
| 8,126,495 B2 | 2/2012 | Wu |
| 8,145,223 B2 | 3/2012 | Guey |
| 8,145,252 B2 | 3/2012 | Sung et al. |
| 8,170,544 B1 | 5/2012 | Satapathy et al. |
| 8,194,630 B2 | 6/2012 | Qvarfordt |
| 8,208,937 B2 | 6/2012 | Zhang |
| 8,229,451 B2 | 7/2012 | Frenger et al. |
| 8,270,976 B2 | 9/2012 | Simonsson et al. |
| 8,275,376 B2 | 9/2012 | Vikberg |
| 8,320,965 B2 | 11/2012 | Kwun |
| 8,340,711 B1 | 12/2012 | Glass et al. |
| 8,400,921 B2 | 3/2013 | Grayson et al. |
| 8,483,743 B2 | 7/2013 | Dimou |
| 8,538,337 B2 | 9/2013 | Damnjanovic |
| 8,588,698 B2 | 11/2013 | Brisebois |
| 8,611,299 B2 | 12/2013 | Yang et al. |
| 8,619,563 B2 | 12/2013 | Madan et al. |
| 8,639,243 B2 | 1/2014 | Radulescu et al. |
| 8,687,585 B2 | 4/2014 | Marks et al. |
| 8,694,044 B2 | 4/2014 | Hiltunen et al. |
| 8,712,459 B2 | 4/2014 | Lim et al. |
| 8,731,567 B2 | 5/2014 | Zhang |
| 8,743,772 B2 | 6/2014 | Garavaglia et al. |
| 8,755,791 B2 | 6/2014 | Bontu et al. |
| 8,761,826 B2 | 6/2014 | Brown et al. |
| 8,792,886 B2 | 7/2014 | Meshkati |
| 8,797,983 B2 | 8/2014 | Sun |
| 8,805,373 B2 | 8/2014 | Chayat |
| 8,830,936 B2 | 9/2014 | Ren |
| 8,838,125 B2 | 9/2014 | Dalsgaard et al. |
| 8,854,998 B2 | 10/2014 | Johansson et al. |
| 8,862,134 B1 | 10/2014 | Zhou |
| 8,874,126 B2 | 10/2014 | Jeong et al. |
| 8,879,441 B2 | 11/2014 | Hunukumbure |
| 8,983,470 B1 | 3/2015 | Ryan |
| 9,014,004 B2 | 4/2015 | Nuss et al. |
| 9,031,591 B2 | 5/2015 | Ma et al. |
| 9,143,995 B2 | 9/2015 | Okmyanskiy et al. |
| 9,148,838 B2 | 9/2015 | Yanover et al. |
| 9,167,444 B2 | 10/2015 | Nuss et al. |
| 9,197,358 B2 | 11/2015 | Hejazi |
| 9,219,816 B2 | 12/2015 | Grayson |
| 9,313,004 B2 | 4/2016 | Yanover et al. |
| 9,332,458 B2 | 5/2016 | Nuss et al. |
| 9,344,970 B2 | 5/2016 | Uplenchwar et al. |
| 9,414,310 B2 | 8/2016 | Grayson |
| 9,490,953 B2 | 11/2016 | Yanover et al. |
| 9,497,708 B2 | 11/2016 | Uplenchwar et al. |
| 9,544,857 B2 | 1/2017 | Carter et al. |
| 9,559,798 B2 | 1/2017 | Nuss et al. |
| 2002/0061742 A1 | 5/2002 | Lapaille |
| 2004/0085909 A1 | 5/2004 | Soliman |
| 2004/0213170 A1 | 10/2004 | Bremer |
| 2005/0064820 A1 | 3/2005 | Park et al. |
| 2005/0215251 A1 | 9/2005 | Krishnan |
| 2005/0282572 A1 | 12/2005 | Wigard et al. |
| 2006/0068712 A1 | 3/2006 | Kroboth et al. |
| 2006/0073791 A1 | 4/2006 | Senarath |
| 2006/0229087 A1 | 10/2006 | Davis et al. |
| 2006/0292989 A1 | 12/2006 | Gerlach |
| 2007/0008885 A1 | 1/2007 | Bonner |
| 2007/0253372 A1 | 11/2007 | Nakayasu |
| 2007/0280170 A1 | 12/2007 | Kawasaki |
| 2008/0004028 A1 | 1/2008 | Vincent |
| 2008/0043623 A1 | 2/2008 | Franceschini |
| 2008/0084844 A1 | 4/2008 | Reznik |
| 2008/0107074 A1 | 5/2008 | Salmenkaita et al. |
| 2008/0139197 A1 | 6/2008 | Misra et al. |
| 2008/0188265 A1 | 8/2008 | Carter et al. |
| 2008/0268833 A1 | 10/2008 | Huang |
| 2009/0054047 A1 | 2/2009 | Kylvaja |
| 2009/0092088 A1 | 4/2009 | Kokku |
| 2009/0129284 A1 | 5/2009 | Jung et al. |
| 2009/0129291 A1 | 5/2009 | Gupta |
| 2009/0232074 A1 | 9/2009 | Yang et al. |
| 2009/0323530 A1 | 12/2009 | Trigui et al. |
| 2010/0009634 A1 | 1/2010 | Budianu |
| 2010/0029282 A1 | 2/2010 | Stamoulis et al. |
| 2010/0034157 A1 | 2/2010 | Stolyar et al. |
| 2010/0056184 A1 | 3/2010 | Vakil |
| 2010/0093358 A1 | 4/2010 | Cheong et al. |
| 2010/0099424 A1 | 4/2010 | Centonza |
| 2010/0110989 A1 | 5/2010 | Wu |
| 2010/0112982 A1 | 5/2010 | Singh et al. |
| 2010/0124930 A1 | 5/2010 | Andrews |
| 2010/0177722 A1 | 7/2010 | Guvenc |
| 2010/0227611 A1 | 9/2010 | Schmidt et al. |
| 2010/0233962 A1 | 9/2010 | Johansson |
| 2010/0240314 A1 | 9/2010 | Chang |
| 2010/0260036 A1 | 10/2010 | Molnar et al. |
| 2010/0260068 A1 | 10/2010 | Bhatt et al. |
| 2010/0267408 A1 | 10/2010 | Lee et al. |
| 2010/0275083 A1 | 10/2010 | Nam et al. |
| 2010/0279628 A1 | 11/2010 | Love et al. |
| 2010/0285795 A1 | 11/2010 | Whinnett |
| 2010/0309864 A1 | 12/2010 | Tamaki |
| 2010/0311449 A1 | 12/2010 | Whinnett |
| 2010/0317351 A1 | 12/2010 | Gerstenberger |
| 2011/0003598 A1* | 1/2011 | Ma ................... H04W 72/0426 455/452.1 |
| 2011/0039539 A1 | 2/2011 | Maida et al. |
| 2011/0039570 A1 | 2/2011 | Maida et al. |
| 2011/0077016 A1 | 3/2011 | Stolyar et al. |
| 2011/0086614 A1 | 4/2011 | Brisebois |
| 2011/0110316 A1 | 5/2011 | Chen et al. |
| 2011/0128862 A1 | 6/2011 | Kallin |
| 2011/0136478 A1 | 6/2011 | Trigui |
| 2011/0151877 A1 | 6/2011 | Tafreshi |
| 2011/0176497 A1 | 7/2011 | Gopalakrishnan |
| 2011/0182375 A1 | 7/2011 | Kim et al. |
| 2011/0195730 A1 | 8/2011 | Chami |
| 2013/0107798 A1 | 5/2013 | Gao et al. |
| 2013/0137447 A1 | 5/2013 | Zhang et al. |
| 2014/0018073 A1 | 1/2014 | Frenger |
| 2014/0153439 A1 | 6/2014 | Nuss et al. |
| 2014/0155081 A1 | 6/2014 | Nuss |
| 2014/0155109 A1 | 6/2014 | Vaidya et al. |
| 2014/0169409 A1 | 6/2014 | Ma et al. |
| 2014/0170965 A1 | 6/2014 | Li |
| 2014/0171143 A1 | 6/2014 | Liu |
| 2014/0185467 A1 | 7/2014 | Heo |
| 2014/0198678 A1 | 7/2014 | Kim et al. |
| 2014/0211739 A1 | 7/2014 | Kim et al. |
| 2014/0213274 A1 | 7/2014 | Weber et al. |
| 2014/0219117 A1 | 8/2014 | Meshkati et al. |
| 2014/0219197 A1 | 8/2014 | Chaudhuri |
| 2014/0220990 A1 | 8/2014 | Lorca Hernando |
| 2014/0226736 A1 | 8/2014 | Niu et al. |
| 2014/0233468 A1 | 8/2014 | Hejazi |
| 2014/0241316 A1 | 8/2014 | Okmyanskiy et al. |
| 2014/0243005 A1 | 8/2014 | Yanover et al. |
| 2014/0269355 A1 | 9/2014 | Monogioudis et al. |
| 2014/0273852 A1 | 9/2014 | McCormack et al. |
| 2014/0274101 A1* | 9/2014 | Venkatesan ........... H04W 28/08 455/453 |
| 2014/0274195 A1 | 9/2014 | Singh |
| 2014/0293906 A1 | 10/2014 | Chang et al. |
| 2014/0302859 A1 | 10/2014 | Nama |

(56) References Cited

U.S. PATENT DOCUMENTS

| | | | |
|---|---|---|---|
| 2014/0328277 | A1 | 11/2014 | Xiao et al. |
| 2014/0335909 | A1 | 11/2014 | Czerepinski |
| 2015/0011222 | A1 | 1/2015 | Brisebois et al. |
| 2015/0011229 | A1 | 1/2015 | Morita et al. |
| 2015/0018028 | A1 | 1/2015 | Uplenchwar et al. |
| 2015/0038190 | A1 | 2/2015 | Carter et al. |
| 2015/0055479 | A1 | 2/2015 | Reider |
| 2015/0063223 | A1 | 3/2015 | Shen |
| 2015/0063231 | A1 | 3/2015 | Seo et al. |
| 2015/0087325 | A1 | 3/2015 | Nuss et al. |
| 2015/0138981 | A1 | 5/2015 | Nuss et al. |
| 2015/0141027 | A1 | 5/2015 | Tsui et al. |
| 2015/0146594 | A1 | 5/2015 | Grayson et al. |
| 2015/0148036 | A1 | 5/2015 | Grayson et al. |
| 2015/0208425 | A1 | 7/2015 | Caretti et al. |
| 2015/0237588 | A1 | 8/2015 | Zhao et al. |
| 2015/0256314 | A1 | 9/2015 | Gauvreau et al. |
| 2015/0312778 | A1 | 10/2015 | Chandrasekhar et al. |
| 2015/0318994 | A1 | 11/2015 | Walsh et al. |
| 2015/0351072 | A1 | 12/2015 | Okmyanskiy et al. |
| 2015/0365855 | A1 | 12/2015 | Nuss et al. |
| 2015/0373698 | A1 | 12/2015 | Uplenchwar et al. |
| 2015/0382367 | A1 | 12/2015 | Yanover et al. |
| 2016/0073426 | A1 | 3/2016 | Bull et al. |
| 2016/0127069 | A1 | 5/2016 | Nuss et al. |
| 2016/0373202 | A1 | 12/2016 | Nuss et al. |

FOREIGN PATENT DOCUMENTS

| | | |
|---|---|---|
| EP | 1895801 | 3/2008 |
| EP | 2296394 | 3/2011 |
| EP | 2337395 | 6/2011 |
| EP | 2395701 | 12/2011 |
| EP | 2445265 | 4/2012 |
| EP | 2466972 | 6/2012 |
| EP | 2533595 | 12/2012 |
| EP | 2566261 | 3/2013 |
| EP | 2306761 | 7/2014 |

OTHER PUBLICATIONS

Liu, Jianquo, et al., "Uplink Power Control and Interference Foordination for Heterogeneous Network," 2012 IEEE 23rd International Symposium on Personal, Indoor and mobile Radio Communications, Sydney, Australia, Sep. 9-12, 2012; 5 pages.
U.S. Appl. No. 15/251,471, filed Aug. 30, 2016, entitled "Method and Apparatus for Reducing Inter-Cell Interference," Inventor: Ziv Nuss, et al.
U.S. Appl. No. 15/089,252, filed Apr. 1, 2016, entitled "Method and System for Dynamic Allocation of Resources in a Cellular Network,".
U.S. Appl. No. 14/479,343, filed Sep. 7, 2014, entitled "Operation of Base Station in a Celllular Communication Network," Inventor: Simon Burley.
U.S. Appl. No. 15/015,691, filed Feb. 4, 2016, entitled "System and Method for Optimizing Performance of a Communication Network," Inventor(s): Ziv Nuss, et al.
U.S. Appl. No. 14/679,868, filed Apr. 6, 2015, entitled "System and Method for Managing Interference in a Network Environment Based on User Presence," Inventors: Mark Grayson, et al.
U.S. Appl. No. 14/687,198, filed Apr. 15, 2015, entitled "System and Method for Managing Interference in a Network Environment Based on User Presence," Inventors: Mark Grayson, et al.
U.S. Appl. No. 14/686,598, filed Apr. 14, 2015, entitled "System and Method for Providing Uplink Inter Cell Interference Coordination in a Network Environment," Inventors: Ritesh K. Madan, et al.
U.S. Appl. No. 14/691,260, filed Apr. 20, 2015, entitled "System and Method for Providing Uplink Inter Cell Interference Coordination in a Network Environment," Inventors: Ritesh K. Madan, et al.
U.S. Appl. No. 14/809,201, filed Jul. 25, 2015, entitled "System and Method to Facilitate Small Cell Uplink Power Control in a Network Environment," Inventors: Ritesh K. Madan, et al.
U.S. Appl. No. 14/833,519, filed Aug. 24, 2015, entitled "System and Method to Facilitate Small Cell Uplink Powercontrol in a Network Environment," Inventors: Ritesh K. Madan, et al.
U.S. Appl. No. 14/918,420, filed Oct. 20, 2015, entitled "System and Method for Frequency and Time Domain Downlink Inter-Cell Interference Coordination," Inventors: Ritesh K. Madan, et al.
U.S. Appl. No. 14/951,987, filed Nov. 25, 2015, entitled "System and Method for Frequency and Time Domain Downlink Inter-Cell Interference Coordination," Inventors: Ritesh K. Madan, et al.
U.S. Appl. No. 14/852,210, filed Sep. 11, 2015, entitled "System and Method for Providing Dynamic Radio Access Network Orchestration," Inventors: Virginia Rosa de Sousa Teixeira, et al.
U.S. Appl. No. 14/961,552, filed Dec. 7, 2015, entitled "System and Method to Provide Uplink Interference Coordination in a Network Environment," Inventor: Ritesh K. Madan.
U.S. Appl. No. 14/993,859, filed Jan. 12, 2016, entitled "System and Method to Facilitate Centralized Radio Resource Management in a Split Radio Access Network Environment," Inventor: Ritesh K. Madan.
U.S. Appl. No. 15/002,187, filed Jan. 20, 2016, entitled "System and Method to Provide Small Cell Power Control and Load Balancing for High Mobility User Equipment in a Network Environment," Inventor: Ritesh K. Madan.
U.S. Appl. No. 15/013,844, filed Feb. 2, 2016, entitled "System and Method to Facilitate Subframe Scheduling in a Split Medium Access Control Radio Access Network Environment," Inventor: Ian Neville Bendle, et al.
U.S. Appl. No. 15/018,677, filed Feb. 8, 2016, entitled "Mitigation of Uplink Interference Within Heterogeneous Wireless Communications Networks," Inventor: Pankaj Uplenchwar, et al.
U.S. Appl. No. 14/801,381, filed Jul. 16, 2015, entitled "System and Method to Manage Network Utilization According to Wireless Backhaul and Radio Access Network Conditions," Inventor: Ishwardutt Parulkar.
U.S. Appl. No. 14/818,084, filed Aug. 4, 2015 entitled "Resource Adaptation for Frequency Domain Downlink Inter-Cell Interference Coordination," Inventors: Ritesh K. Madan et al.
U.S. Appl. No. 14/811,580, filed Jul. 28, 2015 entitled "Determining Fractional Frequency Reuse Power Levels for Downlink Transmissions," Inventor: Ritesh K. Madan.
U.S. Appl. No. 14/816,957, filed Aug. 3, 2015 entitled "Selecting Cells for Downlink Inter-Cell Interference Coordination," Inventors: Rohit U. Nabar et al.
U.S. Appl. No. 14/816,990, filed Aug. 3, 2015 entitled "User Equipment Power Level Selection for Downlink Transmissions," Inventors: Vikram Chandrasekhar et al.
"ETSI TR 136 902 V9.3.1 (May 2011) Technical Report: LTE; Evolved Universal Terrestrial Radio Access Network 9E-UTRAN); Self-configuring and self-optimizing network (SON) use cases and solutions (3GPP TR 36.902 version 9.3.1 Release 9)," ETSI, European Telecommunications Standards Institute, 650 Route des Lucioles F-06921 Sophia Antipolis Cedex—France, May 2011; 23 pages.
"ETSI TS 123 007 V12.6.0 (Oct. 2014) Technical Specification: Digital Cellular Telecommunications System (Phase 2+); Universal Mobile Telecommunications System (UMTS); LTE; Restoration procedures (EGPP TS 23.007 version 12.6.0 Release 12)," ETSI, 650 Route des Lucioles, F-06921, Sophia Antipolis Cedex-France, Oct. 2014; 93 pages.
"ETSI TS 123 401 V9.5.0 (Jun. 2010) Technical Specification: LTE; General Packet Radio Service (GPRS) enhancements for Evolved Universal Terrestrial Radio Access Network (E-UTRAN) access (3GPP TS 23.401 version 9.5.0 Release 9)," ETSI, 650 Route des Lucioles, F-06921, Sophia Antipolis Cedex-France, Jun. 2010; See Section 4, pp. 15-46.
"ETSI TS 123 401 V11.10.0 (Jul. 2014) Technical Specification: LTE; General Packet Radio Service (GPRS) enhancements for Evolved Universal Terrestrial Radio Access Network (E-UTRAN) access (3GPP TS 23.401 version 11.10.0 Release 11)," [Relevant

(56) References Cited

OTHER PUBLICATIONS

Sections 5.3.1.2 and 5.3.4.3 only]; ETSI, 650 Route des Lucioles, F-06921, Sophia Antipolis Cedex-France, Jul. 2014.
"ETSI TS 123 401 V12.6.0 (Sep. 2014) Technical Specification: LTE; General Packet Radio Service (GPRS) enhancements for Evolved Universal Terrestrial Radio Access Network (E-UTRAN) access (3GPP TS 23.401 version 12.6.0 Release 12)," ETSI, 650 Route des Lucioles, F-06921, Sophia Antipolis Cedex-France, Sep. 2014; 308 pages.
"ETSI TS 123 401 V12.70 (Jan. 2015) Technical Specification: LTE; General Packet Radio Service (GPRS) enhancements for Evolved Universal Terrestrial Radio Access Network (E-UTRAN) access (EGPP TS 23.401 version 12.7.0 Release 12)," Section 4 only, European Telecommunications Standards Institute, 650 Route des Lucioles, F-06921 Sophia Antipolis Cedex, France; Jan. 2015; 77 pages.
"ETSI TS 125 133 V12.6.0 (Jan. 2013) Technical Specification: Universal Mobile Telecommunications System 9UMTS); Requirements for support of radio resource management (FDD) (3GPP TS 25.133 version 12.6.0 Release 12);" ETSI, European Telecommunications Standards Institute 2012, 650 Route des Lucioles, F-06921 Sophia Antipolis Cedex—France, Jan. 2015; 368 pages.
"ETSI TS 125 211 V11.5.0 (Jul. 2014) Technical Specification: Universal Mobile Telecommunications System (UMTS); Physical channels and mapping of transport channels onto physical channels (FDD) (3GPP TS 25.211 version 11.5.0 Release 11)," [Relevant Section 7 only]; ETSI, 650 Route des Lucioles, F-06921, Sophia Antipolis Cedex-France, Jul. 2014.
"ETSI TS 125 215 V 12.0.0 (Sep. 2014) Technical Specification: Universal Mobile Telecommunications System (UMTS); Physical layer; Measurements (FDD) (3GPP TS 25.215 version 12.0.0 Release 12);" ETSI, European Telecommunications Standards Institute 2012, 650 Route des Lucioles, F-06921 Sophia Antipolis Cedex—France, Sep. 2014; 26 pages.
"ETSI TS 125 224 V12.0.0 (Sep. 2014) Technical Specification: Universal Mobile Telecommunications System (UMTS); Physical layer procedures (TDD) (3GPP TS 25.224 version 12.0.0 Release 12);" ETSI, European Telecommunications Standards Institute 2012, 650 Route des Lucioles, F-06921 Sophia Antipolis Cedex—France, Sep. 2014; 86 pages.
"ETSI TS 125 331 V11.10.0 (Jul. 2014) Technical Specification: Universal Mobile Telecommunications System (UMTS); Radio Resource Control (RRC); Protocol Specification," ETSI, 650 Route des Lucioles, F-06921, Sophia Antipolis Cedex-France, Jul. 2014, © European Telecommunications Standards Institute 2014. All Rights Reserved. [Relevant Portions: § 7.2.2 pp. 55-58; § 8.1.2 pp. 105-108; § 8.1.4 pp. 126-129; § 8.3.1 pp. 215-260; § 8.3.8-8.3.9 pp. 289-292; § 8.5.21 pp. 357-365; § 10.2.7 pp. 620-623; Annex B.3 pp. 2045-2052].
"ETSI TS 125 367 V9.4.0, Universal Mobile Telecommunications System (UMTS); Mobility procedures for Home Node B (HNB); Overall description; Stage 2 (3GPP TS25.367 version 9.4.0 Release 9)", European Telecommunications Standards Institute, 650 Route des Lucioles, F-06921 Sophia Antipolis Cedex, France, Jun. 2010; 17 pages.
"ETSI TS-125-469 V9.3.0 (Oct. 2010) Technical Specification: Universal Mobile Telecommunications System (UMTS); UTRAN Iuh interface Home Node B (HNG) Application Part (HNBAP) signaling (3GPP TS 25.469 version 9.3.0 Release 9)," ©European Telecommunications Standards Institute 2010; Oct. 2010; 64 pages.

\* cited by examiner

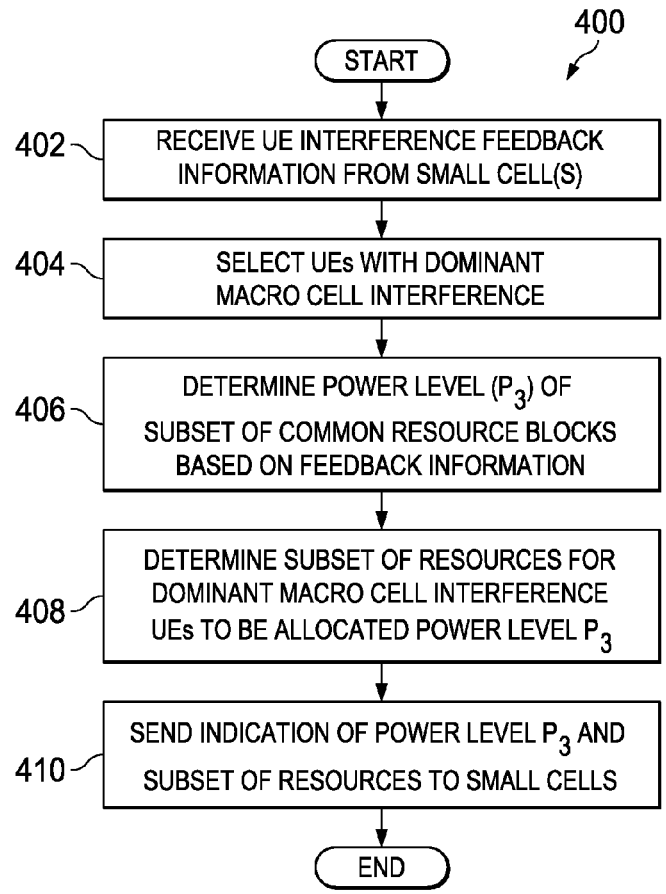
FIG. 4
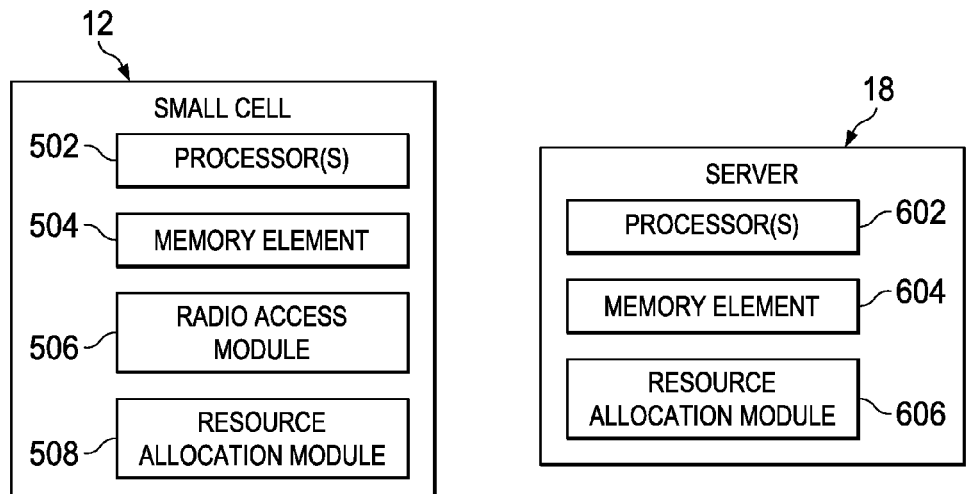
FIG. 5
FIG. 6

SERVING NOISE/MACRO INTERFERENCE LIMITED USER EQUIPMENT FOR DOWNLINK INTER-CELL INTERFERENCE COORDINATION

TECHNICAL FIELD

This disclosure relates in general to the field of communications and, more particularly, to serving noise/macro interference limited user equipment for downlink inter-cell interference coordination (ICIC).

BACKGROUND

Long Term Evolution (LTE) networks often employ fractional frequency reuse (FFR) schemes in order to optimally allocate frequencies within a cellular network. FFR partitions a cell's (e.g. an LTE eNodeB) bandwidth among user equipment within the network such that cell-edge users of adjacent cells do not interfere with each other and interference received by cell interior users is reduced. The use of FFR in a cellular network is a tradeoff between improvement in rate and coverage for cell edge users, and sum network throughput and spectral efficiency for the network.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 4 is a simplified flow diagram illustrating example operations associated with the server in one example embodiment of the communication system;

FIG. 5 illustrates an embodiment of a small cell of the communication system of FIG. 1; and FIG. 6 illustrates an embodiment of a server of the communication system of FIG. 1.

DETAILED DESCRIPTION OF EXAMPLE EMBODIMENTS

Overview

Figure 1:
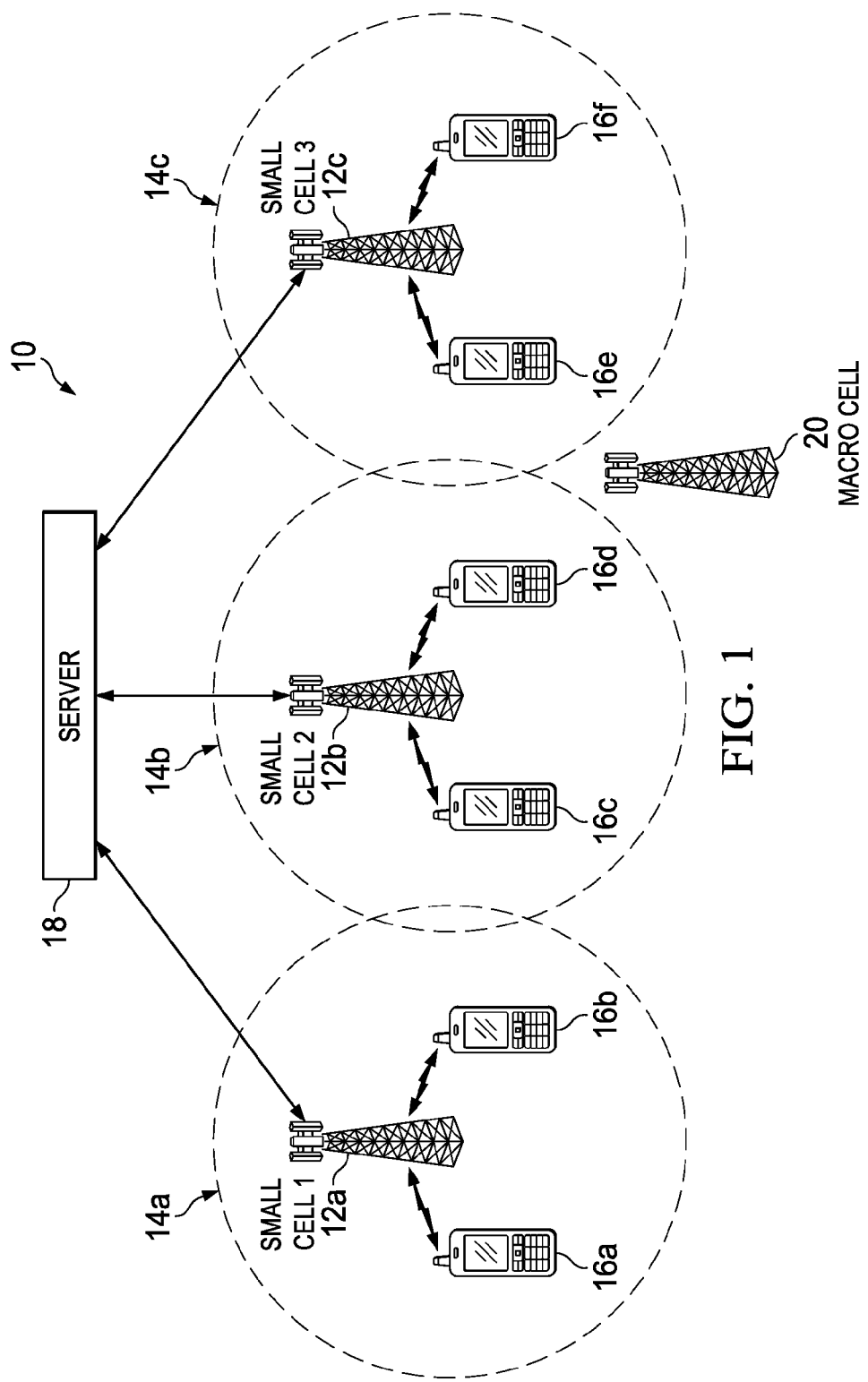
FIG. 1 is a simplified block diagram of a communication system for resource allocation in a fractional frequency reuse (FFR) cellular network in accordance with one embodiment of the present disclosure.

A method according to one embodiment includes receiving feedback information from at least one controlled cell indicative of interference received at one or more user equipment devices served by the at least one cell. The at least one controlled cell is controlled by an operator associated with the at least one controlled cell. The method further includes selecting one or more user equipment devices that is determined to have received interference from at least one non-controlled cell that is greater than a predetermined threshold. The at least one non-controlled cell is not controlled by the operator associated with the at least one controlled cell. The method still further includes determining a power level for a subset of common resources from among a set of common resources shared among the at least one controlled cell based upon the received feedback information.

In a particular embodiment, the method further includes sending an indication of the determined power level to the at least one controlled cell. In still another particular embodiment, the method further includes determining the subset of common resources based upon the feedback information. In another particular embodiment, the method further includes sending an indication of the subset of common resources to the at least one controlled cell.

In another particular embodiment, the power level is determined based upon performance criteria for user equipment devices determined to have received interference from the at least one non-controlled cell that is greater than the predetermined threshold. In another particular embodiment, the subset of common resources is determined based upon performance criteria for user equipment devices determined to have received interference from the at least one non-controlled cell that is greater than the predetermined threshold. In still another particular embodiment, the amount of interference at a user equipment device is determined based upon Reference Signal Received Power (RSRP) reports received from the at least one controlled cell.

In another particular embodiment, determining the power level for the subset of common resources includes determining a candidate power level for each of a plurality of signal-to-interference-plus-noise ratio (SINR) threshold values, and selecting an optimal SINR threshold value and corresponding power level from among the plurality of SINR threshold values and corresponding power levels using a predetermined selection criterion. In still another embodiment, the predetermined selection criterion maximizing a sum of log rates of user equipment devices for which non-controlled cell interference is not the dominant interferer. In another particular embodiment, the predetermined selection criterion includes maximizing a sum of log rates for all user equipment devices of the one or more user equipment devices.

In a particular embodiment, the at least one controlled cell includes a small cell. In another particular embodiment, the at least one non-controlled cell includes a macro cell.

One or more non-transitory tangible media according to one embodiment includes code for execution and when executed by a processor operable to perform operations including receiving feedback information from at least one controlled cell indicative of interference received at one or more user equipment devices served by the at least one cell. The at least one controlled cell is controlled by an operator associated with the at least one controlled cell. The method further includes selecting one or more user equipment devices that is determined to have received interference from at least one non-controlled cell that is greater than a predetermined threshold. The at least one non-controlled cell is not controlled by the operator associated with the at least one controlled cell. The method still further includes determining a power level for a subset of common resources from among a set of common resources shared among the at least one controlled cell based upon the received feedback information.

An apparatus according to one embodiment includes a memory element configured to store data, a processor operable to execute instructions associated with the data, and at least one module being configured to receive feedback information from at least one controlled cell indicative of interference received at one or more user equipment devices served by the at least one cell. The at least one controlled cell is controlled by an operator associated with the at least one controlled cell. The at least one module is further configured to select one or more user equipment devices that is determined to have received interference from at least one non-controlled cell that is greater than a predetermined threshold. The at least one non-controlled cell is not controlled by the operator associated with the at least one controlled cell. The at least one module is further configured to determine a power level for a subset of common resources from among a set of common resources shared among the at least one controlled cell based upon the received feedback information.

Example Embodiments

Referring now to FIG. 1, FIG. 1 is a simplified block diagram of a communication system 10 for resource allocation in a fractional frequency reuse (FFR) cellular network in accordance with one embodiment of the present disclosure. Communication system 10 of FIG. 1 includes a first small cell (Small Cell 1) 12a having a first coverage area 14a, a second small cell (Small Cell 2) 12b having a second coverage area 14b, and a third small cell (Small Cell 3) 12c having a third coverage area 14c. In accordance with one or more embodiments, first small cell 12a, second small cell 12b, and third small cell 12c are each a Long Term Evolution (LTE) evolved small cell. Small cells are low-powered radio access nodes having coverage areas that are typically smaller than that of a macro cell. A macro cell is a cell in a mobile network that typically provides radio coverage that is larger than a small cell and are often served by a high power cellular base station (e.g., a cellular tower). The antennas for macro cells are typically mounted on ground-based masts, rooftops and other existing structures. Small cells are typically centrally managed by mobile network operators. In some embodiments, one or more of first small cell 12a, second small cell 12b, and third small cell 12c may be a femtocell, picocell, microcell or any suitable radio access node or base station. First coverage area 14a, second coverage area 14b, and third coverage area 14c are representative of a geographic area for which first small cell 12a, second small cell 12b, and third small cell 12c, respectively, can effectively provide service to a user equipment device therein. In one or more embodiments, first small cell 12a, second small cell 12b, and third small cell 12c allocate resources within their respective coverage areas 14a-1cb using a frequency domain inter-cell interference coordination (ICIC) framework in which interference is managed through Fractional Frequency Reuse (FFR). In particular embodiments, it is assumed that that all cells that participate in the ICIC scheme have the same fraction of resources in reuse one portion of the spectrum and the FFR portion of the spectrum.

First small cell 12a includes a first user equipment (UE) device 16a and a second user equipment (UE) device 16b located within first coverage area 14a and served by first small cell 12a. Second small cell 12b includes a third user equipment (UE) device 16c and a fourth user equipment (UE) device 16d located within second coverage area 14b and served by second small cell 12b. Third small cell 12c includes a fifth user equipment (UE) device 16e and a sixth user equipment (UE) device 16f located within third coverage area 14c and served by third small cell 12c. In one or more embodiments, first small cell 12a, second small cell 12b, and third small cell 12c allocate resources within their respective coverage areas 14a-14c using fractional frequency reuse (FFR) as will be further described herein.

In at least one embodiment, each of first UE 16a, second UE 16b, third UE 16c, fourth UE 16d, fifth UE 16e, and sixth UE 16f is a mobile device having the ability to communicate with and handover between one or more of first small cell 12a, second small cell 12b, and third small cell 12c using one or more mobile wireless connections. In accordance with various embodiments, one or more of UEs 16a-16f may include a computer (e.g., notebook computer, laptop, tablet computer or device), a tablet, a cell phone, a personal digital assistant (PDA), a smartphone, or any other suitable device having the capability to communicate using wireless access technologies with one or more of first small cell 12a, second small cell 12b, and third small cell 12c.

Communication system 10 further includes a server 18 in communication with each of first small cell 12a, second small cell 12b, and third small cell 12c. In one or more embodiments, server 18 is located in an evolved packet core (EPC) network which may include one or more of a serving GPRS support node (SGSN)/mobile management entity (MME), a home subscriber server (HSS), a serving gateway (SGW), a packet data network (PDN) gateway (PGW), a policy and charging rules function (PCRF), and one or more packet networks. In a particular embodiment, server 18 is a small cell centralized operations, administration, and maintenance (OAM)/radio resource manager (RRM) server. In one or more embodiments, server 18 is controlled by a mobile network operator associated with first small cell 12a, second small cell 12b, and third small cell 12c.

In the particular embodiment illustrated in FIG. 1, communication system 10 further includes a macro cell 20. In particular embodiments, macro cell 20 may include an LTE eNodeB or any other mobile base station. Typically, macro cells operate with higher transmission power than that of small cells. Thus, a macro cell may sometimes cause interference to UEs connected to a small cell. In one or more embodiments, macro cell 20 may be located proximate to one or more of UEs 16a-16f such that one or more of UEs 16a-16f may receive signal interference from macro cell 20. In one or more embodiments, macro cell 20 may be associated with a different mobile network operator than that associated with first small cell 12a, second small cell 12b, and third small cell 12c such that the mobile network operator associated with small cells 12a-12c has no control over the characteristics (e.g., transmission power) of signals transmitted by macro cell 20. In the particular embodiment illustrated in FIG. 1, macro cell 20 is a non-controlled cell that causes signal interference with one or more of UEs 16a-16f. Although various embodiments are described herein with reference to a macro cell 20 interfering with UEs associated with small cells 12a-12c, it should be understood that the principles describe herein are applicable to any other source of interference such as another small cell not under control of the mobile network operator associated with small cells 12a-12c.

A particular UE may be located at a cell edge of a coverage area of its serving cell and experience a low signal-to-interference-plus-noise ratio (SINR)/signal-to-noise ratio due to noise at the UE and/or interference from a macro cell or a non-operator controlled small cell (e.g. a small cell controlled by a mobile network operator different from that of the serving cell). In existing systems, resources for power boosting are typically coordinated to be orthogonal in frequency among neighboring cells or not coordinated at all. In addition, in existing systems no distinction is made among low SINR users (e.g., based on Reference Signal Received Power (RSRP) on reuse one resource blocks (RBs) with uniform power distribution) on whether the SINR is low due to another small cell within control of the same mobile network operator, a macro cell or other small cell not controlled by the mobile network operator, or noise limited UEs. Accordingly, existing approaches may lead to a significant waste of spectral resources.

For cell edge UEs, orthogonal or quasi-orthogonal resources are often used between neighboring cells. However, for UEs that are limited by interference caused by macro cell 20, there is no need for small cells 12a-12c to use orthogonal resources among themselves. Because the interference at the UEs is dominated by that caused by macro cell 20, small cells 12a-12c may use common resources and the transmission power of the common resources may be increased to mitigate the effects of the macro interference. In one or more embodiments, server 18 provides each of first small cell 12a, second small cell 12b, and third small cell 12c with a cell identifier (such a physical cell identity (PCI)/Evolved Cell Global Identifier (ECGI)) to unsure that UE measurement reports from macro cells can be distinguished from those from small cells 12a-12c. In at least one embodiment, server 18 is configured to receive feedback from each of first small cell 12a, second small cell 12b, and third small cell 12c related to interference experienced by the UEs served by each small cell that is induced from one or more cells not under control of the mobile operator associated with small cells 12a-12c. In one or more embodiments, server 18 is configured to use the feedback received from each of small cells 12a-12c to employ a coordination scheme between small cells 12a-12c such that cell edge UEs can be served at an acceptable SINR through power boosting and use of minimal resources.

In accordance with various embodiments, a common set of resources is allocated within the frequency spectrum to share among small cells 12a-12c. Based upon the feedback received from each of first small cell 12a, second small cell 12b, and third small cell 12c, server 18 determines which of UEs 16a-16f are macro interference dominated, selects a particular subset of resource blocks within the common set of resources to be boosted in power level, and determines the particular transmission power level to which the selected subset of resource blocks are to be boosted. Server 18 is further configured to send power boosting information to each of first small cell 12a, second small cell 12b, and third small cell 12c including an indication of the predetermined subset of resource blocks within the common set of resources to be power boosted and the determined particular power level to which the subset of resource blocks is to be boosted (i.e., increased). Upon receiving the power boosting information, small cells 12a-12c use the indicated subset of resource blocks and indicated transmission power level for downlink signal transmission for UEs 16a-16f served by the particular small cells 12a-12c.

In one or more embodiments, the determined power level to which the subset of resource blocks is to be boosted (e.g., amount of power boosting) and chosen subset of resource blocks (e.g., amount of spectrum for power boosting) is based upon desired performance criterion for UEs which receive strong interference from non-controlled cells (e.g. macro-cells associated with another mobile network operator) as well as on desired performance of other UEs within the network of communication system 10. In particular embodiments, the amount of interference experienced at a particular UE is computed on the basis of RSRP reports from controlled small cells (e.g., small cells controlled by the mobile operator) and side information including cell identities of controlled small cells.

Before detailing some of the operational aspects of FIG. 1, it is important to understand different scenarios involving location of user equipment in a mobile network. The following foundation is offered earnestly for teaching purposes only and, therefore should not be construed in any way to limit the broad teachings of the present disclosure. The basic idea of FFR is to partition the cell's bandwidth so that (i) cell-edge users of adjacent cells do not interfere with each other and (ii) interference received by (and created by) cell interior users is reduced, while (iii) using more total spectrum than classical frequency reuse. The use of FFR in cellular network is a tradeoff between improvement in rate and coverage for cell edge users, and sum network throughput and spectral efficiency. FFR is a compromise between hard and soft frequency reuse. Hard frequency reuse splits the system bandwidth into a number of distinct sub bands according to a chosen reuse factor and allows neighbor cells to transmit on different sub bands. FFR splits the given bandwidth into an inner and outer portions. FFR allocates an inner portion to the UEs located near to the eNodeB in terms of path loss with reduced power applying frequency reuse factor of one, i.e. the inner portion is completely reused by all eNodeBs. For the UEs close to the cell edge, a fraction of the outer portion of the bandwidth is dedicated with a frequency reuse factor greater than one. With soft frequency reuse the overall bandwidth is shared by all eNodeBs (i.e., a reuse factor of one is applied) but for the transmission on each sub-carrier, the eNBs are restricted to a particular power bound.

There are two common FFR models: strict FFR and Soft Frequency Reuse (SFR). Strict FFR is a modification of the traditional frequency reuse in which exterior frequency subbands are not shared with the inner frequency bands. Soft Frequency Reuse (SFR) employs the same cell-edge bandwidth partitioning strategy as Strict FFR, but the interior UEs are allowed to share subbands with edge UEs in other cells. Accordingly, shared subbands by interior UEs users are transmitted at lower power levels than for the cell edge UEs. SFR is more bandwidth efficient than strict FFR, but results in more interference to both cell-interior and edge UEs.

Figure 2A:
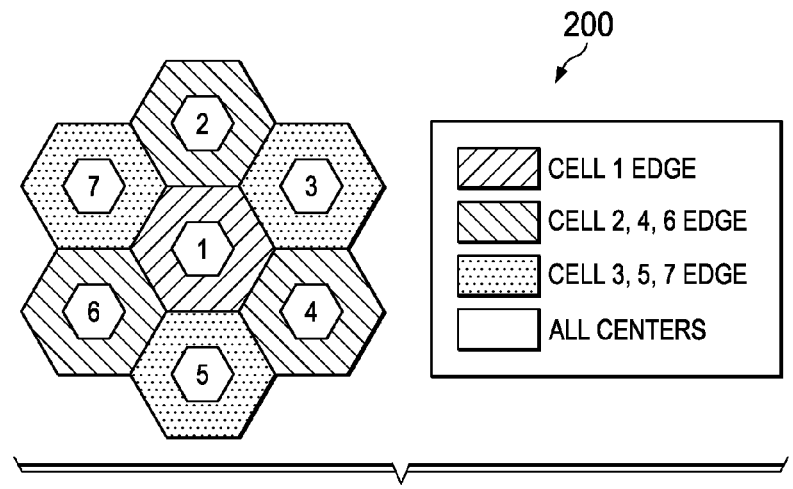
FIGS. 2A-2B illustrate an example of bandwidth allocation using fractional frequency reuse for a number of cells.
Figure 2B:
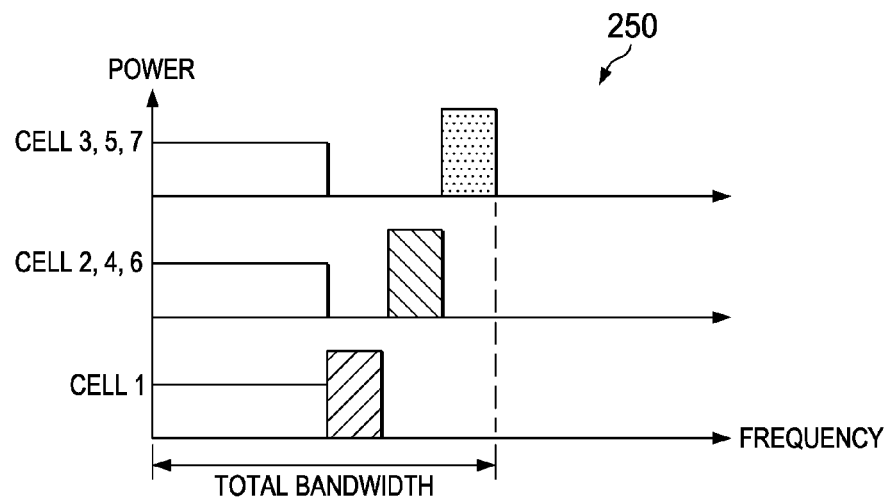

FIGS. 2A-2B illustrate an example of bandwidth allocation using fractional frequency reuse for a number of cells. In the example of FIGS. 2A-2B, seven cells are arranged in a hexagonal configuration 200 with Cell 1 in the center and surround by Cells 2-7 numbered in a clockwise pattern in which strict FFR for reuse 3 is employed at cell edge UEs. In the example illustrated in FIGS. 2A-2B a power allocation scheme 250 is shown in which the inner portion of each of cells 1-8 is allocated a first frequency portion of the total frequency bandwidth at a particular power level $P_1$. The edges of cell 1 are allocated a second portion of the total bandwidth at a power level $P_2$, the edges of cells 2, 4, and 6 are allocated a third portion of the total bandwidth at a power level $P_3$, and the edges of cells 3, 5, and 7 area allocated a fourth portion of the total bandwidth at a power level $P_4$.

Figure 3:
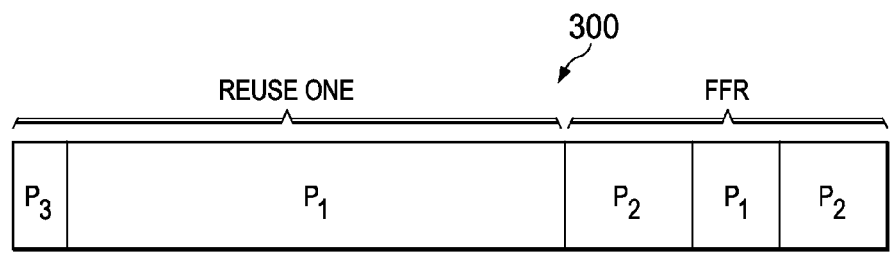
FIG. 3 is a simplified diagram of an example of resource block power allocation 300 for the communication system of FIG. 1 in accordance with one embodiment.

Referring now to FIG. 3, FIG. 3 is a simplified diagram of an example of resource block power allocation 300 for communication system 10 of FIG. 1 in accordance with one embodiment. To overcome the effect of multipath fading problem present in Universal Mobile Telecommunications System (UMTS), LTE uses Orthogonal Frequency Division Multiplexing (OFDM) for downlink from the base station to the UE to transmit the data over many narrow band carriers of 180 KHz each instead of spreading one signal over the complete 5 MHz career bandwidth. Accordingly, OFDM uses a large number of narrow sub-carriers for multi-carrier transmission to carry data. Orthogonal frequency-division multiplexing (OFDM), is a frequency-division multiplexing (FDM) scheme used as a digital multi-carrier modulation method and meets the LTE requirement for spectrum flexibility and enables cost-efficient solutions for very wide carriers with high peak rates. The basic LTE downlink physical resource can be seen as a time-frequency grid in which the OFDM symbols are grouped into resource blocks. In LTE, the resource blocks have a total size of 180 kHz in the frequency domain and 0.5 ms in the time domain. A resource element (RE) is the smallest defined unit which consists of one OFDM sub-carrier during one OFDM symbol interval. Each resource block (RB) consists of 12·7=84 resource elements in case of normal cyclic prefix (72 for extended CP). Each UE is allocated a number of the resource blocks in the time frequency grid. The more resource blocks a UE is allocated, and the higher the modulation used in the resource elements, the higher the bit-rate. Which resource blocks and how many the UE is allocated at a given point in time depends upon frequency and time scheduling mechanisms.

FIG. 3 illustrates frequency domain power variation across multiple cells to mitigate interference between the cells. In the reuse portion there are a number of resource blocks (RBs) in which all the cells on the downlink use the same amount of transmit power per RB. As described above, a RB is an allocated portion of time and frequency spectrum used for downlink transmission from the cell to one or more UEs. If there was no interference, management in every cell would transmit at the same power across all the resources, and the interference a UE would experience on the downlink would be same across frequency from all of the cells if they were all fully loaded.

In the embodiment of FIG. 3, three different power levels ($P_1$, $P_2$, and $P_3$) for resource blocks (RBs) are illustrated in which $P_3>=P_1>P_2$. In the illustrated embodiment, $P_1$ is the power level of a first subset of resource blocks (RBs) in the reuse one portion of the spectrum that are not chosen to be boosted in power level by server 18, and $P_3$ is the power level of second a subset of resource blocks within the reuse one portion of the spectrum that are chosen to be at boosted power level by server 18. In the FFR portion of the spectrum, a given cell transmits at a higher power on the $P_1$ portion of the FFR, and lowers its power per RB on the rest of the RBs in that part of the frequency, which is $P_2$. If a given cell increases its power $P_1$ in the FFR portion of the spectrum, then a neighboring cell will reduce its power in the same portion but will have a higher power of transmission on $P_2$. Accordingly in the FFR portion, one cell may increase its power on one part of the FFR spectrum and neighboring cells may reduce their power on the same part of the FFR spectrum. In accordance with one or more embodiments, a small cell boosts the Energy Per Resource Element (EPRE) on a fraction of RBs in the frequency domain. In particular embodiments, the power per RB, $P_3>P_{tot}/N_{RB}$ where $P_{tot}$ is total available transmit power for the Physical Downlink Shared Channel (PDSCH), and $N_{RB}$ is the total number of RBs for the small cell.

Referring again to FIG. 1, in one embodiment server 18 provides each of small cells 12a-12c with a cell identifier such as a PCI/ECGI. Each of first small cell 12a, second small cell 12b, and third small cell 12c receives interference statistics from the UEs served by the particular small cell. Then each of first small cell 12a, second small cell 12b, and third small cell 12c sends feedback information indicative of non-small cell interference (e.g., macro cell interference) received at UEs served by the particular small cell to server 18.

In a particular embodiment, the UE interference feedback information includes: (1) the number of UEs which have interference+noise level to be within a fixed threshold Δ of power received from the serving cell based on RSRP; (2) a maximum ratio of RSRP from the interfering macro/non-controlled cell to serving cell RSRP; (3) a maximum ratio of residual interference estimated at the UE after subtracting estimated interference from controlled cells with respect to serving cell RSRP; and (4) a maximum hand-in threshold of minimum ratio of target cell RSRP and source cell RSRP for all non-controlled source cells. Based upon this feedback information, server 18 determines a power level $P_3$ to boost the transmission power of the subset of resource blocks from the set of common resource blocks and determines the particular subset of resource blocks of the set of common resource blocks that are to be boosted to the power level $P_3$. Server 18 then sends power boosting information to each of first small cell 12a, second small cell 12b, and third small cell 12c including an indication of the power level $P_3$ and an indication of the subset of resource blocks from the set of common resource blocks to be allocated power level $P_3$. Upon receiving the power boosting information, first small cell 12a, second small cell 12b, and third small cell 12c use the indicated subset of resource blocks and indicated power level $P_3$ for downlink transmissions to the UEs.

Referring now to FIG. 4, FIG. 4 is a simplified flow diagram 400 illustrating example operations associated with server 18 in one example embodiment of communication system 10. In 402, server 18 receives UE interference feedback information from each of cells 12a-12c indicative of interference received at UEs served by the particular small cell 12a-12c from one or more cells not controlled by an operator associated with small cells 12a-12c. In a particular embodiment, the UE interference feedback information includes: (1) the number of UEs which have interference+noise level to be within a fixed threshold Δ of power received from the serving cell based on RSRP; (2) a maximum ratio of RSRP from the interfering macro/non-controlled cell to serving cell RSRP; (3) a maximum ratio of residual interference estimated at the UE after subtracting estimated interference from controlled cells with respect to serving cell RSRP; and (4) a maximum hand-in threshold of minimum ratio of target cell RSRP and source cell RSRP for all non-controlled source cells.

In 404, server 18 selects the UEs from among the UEs (e.g., UEs 16a-16f) served by small cells 12a-12c that are considered to have dominant macro cell interference based upon the received UE interference feedback information. In a particular embodiment, a UE is considered to have dominant macro cell interference if the following conditions are satisfied: (1) RSRP from the macro cell is at least a first predetermined threshold $\Delta_1$ (e.g., $\Delta_1=5$ dB) higher than RSRP from the strongest neighboring small cell; and (2) RSRP from the macro cell is higher than the serving cell RSRP minus a second predetermined threshold $\Delta_2$ (e.g., $\Delta_2=3$ dB).

In 406, server 18 determines the power level $P_3$ of the subset of common resource blocks shared among small cells 12a-12c based on the received UE interference feedback information. In one or more embodiments, power level $P_3$ is determined based upon a determined SINR threshold of macro cell interfered UEs that provides for an optimized performance of macro cell interference limited UEs as well as other UEs within communication system 10. An example equation to determine SINR of a macro cell interfered UEs is as follows: SINR=$P_3$*serving_cell_gain/(macro interfer+sum_of_P3* neigh_small_cell_gain) in which serving_cell_ gain is equal to the serving cell gain, macro interfer is equal to the macro cell interference, and neigh_small_cell_gain is equal to the neighboring small cell interference gain.

It should be noted that increasing $P_3$ increases SINR as long as the macro cell interference is higher than small cell interference in the denominator of the equation. However, increasing $P_3$ reduces SINRs for other UEs which do not experience high macro cell interference, but may have moderate macro cell interference relative to small cell interference. Increasing $P_3$ reduces the average power used to serve other UEs for which macro cell interference is not the only dominant interferer, e.g., UEs which experience both small cell and macro cell interference. This leads to lower signal-to-noise ratio (SNR).

In some embodiments, the value of $P_3$ can be chosen to guarantee a minimum SINR threshold on a RB to a certain percentage (e.g., 95%) of UEs with dominant macro cell interference. In particular embodiments, the minimum SINR may be based on a current distribution of UE SINRs, or on the basis of a threshold ratio of RSRP chosen for hand-in of a UE to a serving small cell.

In 408, server 18 determines the subset of resources (e.g., RBs) from among a set of common resources for the dominant macro cell interference UEs to be allocated the power level $P_3$. In some embodiments, for a given SINR threshold the number of RBs with power level $P_3$ are chosen to support a predetermined number of voice calls for UEs with dominant macro cell interference. In a particular embodiment, the number of RBs with power level $P_3$ are chosen based upon a minimum of voice calls to be supported for UEs with strong macro cell interference constrained by the maximum actual number of such UEs in all cells. Alternately, the number of RBs with power level $P_3$ are chosen based upon the maximum throughput that is sustained summed across macro cell interference dominated UEs in a cell. In various embodiments, the minimum SINR threshold can be chosen statistically, or can be chosen based on a one-dimensional search for a threshold to optimize performance of other UEs, e.g., a median throughput or predetermined (e.g., 10th) percentile throughput.

In particular embodiments, the FFR scheme on resources other than those used to serve UEs with dominant macro cell interference is fixed such that only the power levels vary due to the fact that a varying SINR threshold changes the power level $P_3$, which in turn changes power levels on other FFR resources.

In one or more embodiments, an iterative procedure is used in which the power level $P_3$ and the subset of resources to allocate to dominant macro cell interference UEs are computed for a range of SINR threshold values and corresponding candidate power levels, and an optimal SINR threshold and corresponding power level $P_3$ and subset of resources is chosen from among the range of SINR threshold values based upon predetermined performance criteria.

In a particular embodiment of an iterative algorithm for determining the power level $P_3$ and corresponding subset of RBs, for each of a range of SINR thresholds (e.g., [0, 1, ..., 10]):

(1) Compute power level $P_3$ required to meet the SINR threshold for macro cell interfered UEs.
(2) Compute the number of resources required for macro cell interfered UEs.
(3) Compute power levels $P_1$, $P_2$ for other RBs based on the FFR scheme and relative values between $P_1$, $P_2$.
(4) Compute UE throughputs for macro cell interfered UEs served by $P_3$ RBs assuming equal division of resources.
(5) Compute UE throughput for UEs served by other RBs assuming equal division of all remaining RBs (e.g., FFR high SINR, FFR low SINR, reuse one SINR).

After the values are computed for each of the SINR thresholds within the range of SINR thresholds, a selection of a best SINR threshold and corresponding power level $P_3$ is chosen based upon a predetermined criterion or predetermined criteria. In particular embodiments, selection of a best SINR threshold and corresponding power level $P_3$ is based on a predetermined selection criterion such as maximizing a sum of log rates of UEs for which macro cell interference is not the dominant interferer while ensuring UEs with dominant interference from the macro cell can sustain voice calls. In other particular embodiments, selection of a best SINR threshold and corresponding $P_3$ is based on maximizing a sum of log rates for all UEs.

In 410, server 18 sends power boosting information including an indication of the determined power level $P_3$ and the determined subset of resources to be used by macro cell interference dominated UEs to each of small cells 12a-12c. Upon receiving the power boosting information, each of small cells 12a-12c allocate resources and power levels to the UEs served by the particular small cell according to the power boosting information. The procedure then ends.

In other embodiments, the described procedures may be modified to include additional enhancements. In one enhancement according to one embodiment, each small cell can potentially have a different boosted power level per RB (e.g., $P_3$), as well as a different number of RBs for which power boosting is performed. In particular embodiments, some or all of the calculations described herein may be performed locally at each of the small cells 12a-12c, and each of small cells 12a-12c may send the results to server 18. Server 18 may then signal a maximum power level per RB, $P_3^{max}$, that a small cell is allowed to have, and a maximum number of RBs, $N_{RB}^{max}$, on which a small cell can employ power boosting to each of small cells 12a-12c. In another embodiment, a particular small cell may be configured to inform neighboring small cells about which RBs have power boosting allocated through Relative Narrowband Transmit Power (RNTP) messages to allow the neighboring small cell to perform appropriate link adaptation.

Referring now to FIG. 5, FIG. 5 illustrates an embodiment of a small cell 12 (such as one or more of small cells 12a-12c) of communication system 10 of FIG. 1. Small cell 12 includes one or more processor(s) 502, a memory element 504, a radio access module 506, and a resource allocation module 508. Processor(s) 502 is configured to execute various tasks of small cell 12 as described herein and memory element 504 is configured to store data associated with small cell 12. Radio access module 506 is configured to wirelessly communication with one or more of UEs 16a-16f. In one or more embodiments, resource allocation module 508 is configured to perform the operations associated with determining allocation of network resources to UEs 16a-16f as described herein. In at least one embodiment, resource allocation module 508 is configured to perform one or more of receiving interference measurements from one or more of UEs 16a-16f, sending UE interference feedback information to server 18, receiving power level boosting information from server 18, and allocating resources to one or more of UEs 16a-16f based upon the power level boosting information.

Referring now to FIG. 6, FIG. 6 illustrates an embodiment of server 18 of communication system 10 of FIG. 1. Server 18 includes one or more processor(s) 602, a memory element 604, and a resource allocation module 606.

Processor(s) 602 is configured to execute various tasks of server 18 as described herein and memory element 604 is configured to store data associated with server 18. Resource allocation module 606 is configured to perform the operations associated with determining allocation of network resources to small cells 12a-12c and/or UEs 16a-16f as described herein. In at least one embodiment, resource allocation module 606 is configured to perform one or more of receiving UE interference feedback information from one or more small cells 12a-12c, determine a power level of a subset of common resource blocks based on the UE interference feedback information, determine the subset of resources for dominant macro interference UEs to be allocated the determined power level, and send an indication of the power level and subset of resources to one or more of small cells 12a-12c.

In regards to the internal structure associated with communication system 10, each of UEs 16a-16f, small cells 12a-12c, server 18, and macro cell 20 can include memory elements for storing information to be used in achieving the operations, as outlined herein. Additionally, each of these devices may include a processor that can execute software or an algorithm to perform the activities as discussed in this Specification. These devices may further keep information in any suitable memory element [random access memory (RAM), read only memory (ROM), an erasable programmable read only memory (EPROM), an electrically erasable programmable ROM (EEPROM), etc.], software, hardware, or in any other suitable component, device, element, or object where appropriate and based on particular needs. Any of the memory items discussed herein should be construed as being encompassed within the broad term 'memory element.' The information being tracked or sent to each of UEs 16a-16f, small cells 12a-12c, server 18, and macro cell 20 could be provided in any database, register, control list, cache, or storage structure: all of which can be referenced at any suitable timeframe. Any such storage options may be included within the broad term 'memory element' as used herein in this Specification. Similarly, any of the potential processing elements, modules, and machines described in this Specification should be construed as being encompassed within the broad term 'processor.' Each of the network elements and mobile nodes can also include suitable interfaces for receiving, transmitting, and/or otherwise communicating data or information in a network environment.

Note that in certain example implementations, the resource allocation functions outlined herein may be implemented by logic encoded in one or more tangible media, which may be inclusive of non-transitory media (e.g., embedded logic provided in an application specific integrated circuit [ASIC], digital signal processor [DSP] instructions, software [potentially inclusive of object code and source code] to be executed by a processor, or other similar machine, etc.). In some of these instances, memory elements can store data used for the operations described herein. This includes the memory elements being able to store software, logic, code, or processor instructions that are executed to carry out the activities described in this Specification. A processor can execute any type of instructions associated with the data to achieve the operations detailed herein in this Specification. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an EPROM, an EEPROM) or an ASIC that includes digital logic, software, code, electronic instructions, or any suitable combination thereof.

Note that with the examples provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and further can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the previously described activities illustrate only some of the possible signaling scenarios and patterns that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, and signaling protocols, communication system 10 may be applicable to other exchanges, routing protocols, or routed protocols in which in order to provide hand-in access to a network. Moreover, although communication system 10 have been illustrated with reference to particular elements and operations that facilitate the communication process, these elements and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
receiving feedback information from at least one controlled cell indicative of interference received at one or more user equipment devices served by the at least one controlled cell, the at least one controlled cell being controlled by an operator associated with the at least one controlled cell;
selecting one or more user equipment devices that is determined to have received interference, from at least one non-controlled cell, that is greater than a predetermined threshold, the at least one non-controlled cell not being controlled by the operator associated with the at least one controlled cell; and
determining a power level for a subset of common resources, from among a set of common resources shared among the at least one controlled cell, based upon the received feedback information, wherein at least one of: the power level and the subset of common resources is determined based upon performance criteria for user equipment devices determined to have received interference from the at least one non-controlled cell that is greater than the predetermined threshold.

2. The method of claim 1, further comprising sending an indication of the determined power level to the at least one controlled cell.

3. The method of claim 1, further comprising determining the subset of common resources based upon the feedback information.

4. The method of claim 3, further comprising sending an indication of the subset of common resources to the at least one controlled cell.

5. The method of claim 1, wherein the power level is determined based upon performance criteria for user equipment devices determined to have received interference from the at least one non-controlled cell that is greater than the predetermined threshold.

6. The method of claim 1, wherein the amount of interference at a user equipment device is determined based upon Reference Signal Received Power (RSRP) reports received from the at least one controlled cell.

7. The method of claim 1, wherein the subset of common resources is determined based upon performance criteria for user equipment devices determined to have received interference from the at least one non-controlled cell that is greater than the predetermined threshold.

8. The method of claim 1, wherein determining the power level for the subset of common resources includes determining a candidate power level for each of a plurality of signal-to-interference-plus-noise ratio (SINR) threshold values, and selecting an optimal SINR threshold value and corresponding power level from among the plurality of SINR threshold values and corresponding power levels using a predetermined selection criterion.

9. The method of claim 8, wherein the predetermined selection criterion includes maximizing a sum of log rates of user equipment devices for which non-controlled cell interference is not the dominant interferer.

10. The method of claim 8, wherein the predetermined selection criterion includes maximizing a sum of log rates for all user equipment devices of the one or more user equipment devices.

11. The method of claim 1, wherein the at least one controlled cell includes a small cell.

12. The method of claim 1, wherein the at least one non-controlled cell includes a macro cell.

13. One or more non-transitory tangible media that includes code for execution and when executed by a processor is operable to perform operations comprising:
receiving feedback information from at least one controlled cell indicative of interference received at one or more user equipment devices served by the at least one controlled cell, the at least one controlled cell being controlled by an operator associated with the at least one controlled cell;
selecting one or more user equipment devices that is determined to have received interference, from at least one non-controlled cell, that is greater than a predetermined threshold, the at least one non-controlled cell not being controlled by the operator associated with the at least one controlled cell; and
determining a power level for a subset of common resources, from among a set of common resources shared among the at least one controlled cell, based upon the received feedback information, wherein determining the power level for the subset of common resources includes determining a candidate power level for each of a plurality of signal-to-interference-plus-noise ratio (SINR) threshold values, and selecting an optimal SINR threshold value and corresponding power level from among the plurality of SINR threshold values and corresponding power levels using a predetermined selection criterion.

14. The media of claim 13, wherein the operations further comprise sending an indication of the determined power level to the at least one controlled cell.

15. The media of claim 13, wherein the operations further comprise determining the subset of common resources based upon the feedback information.

16. The media of claim 15, wherein the operations further comprise sending an indication of the subset of common resources to the at least one controlled cell.

17. The media of claim 13, wherein the power level is determined based upon performance criteria for user equipment devices determined to have received interference from the at least one non-controlled cell that is greater than the predetermined threshold.

18. The media of claim 17, wherein the amount of interference at a user equipment device is determined based upon Reference Signal Received Power (RSRP) reports received from the at least one controlled cell.

19. The media of claim 13, wherein the subset of common resources is determined based upon performance criteria for user equipment devices determined to have received interference from the at least one non-controlled cell that is greater than the predetermined threshold.

20. The media of claim 13, wherein the predetermined selection criterion includes maximizing a sum of log rates of user equipment devices for which non-controlled cell interference is not the dominant interferer.

21. The media of claim 13, wherein the predetermined selection criterion includes maximizing a sum of log rates for all user equipment devices of the one or more user equipment devices.

22. An apparatus, comprising:
a processor; and
a memory storing a program, which, when executed on the processor, performs an operation, the operation comprising:
receiving feedback information from at least one controlled cell indicative of interference received at one or more user equipment devices served by the at least one controlled cell, the at least one controlled cell being controlled by an operator associated with the at least one controlled cell;

selecting one or more user equipment devices that is determined to have received interference, from at least one non-controlled cell, that is greater than a predetermined threshold, the at least one non-controlled cell not being controlled by the operator associated with the at least one controlled cell; and determining a power level for a subset of common resources, from among a set of common resources shared among the at least one controlled cell, based upon the received feedback information, wherein at least one of: the power level and the subset of common resources is determined based upon performance criteria for user equipment devices determined to have received interference from the at least one non-controlled cell that is greater than the predetermined threshold.

23. The apparatus of claim 22, wherein the at least one module is further configured to send an indication of the determined power level to the at least one controlled cell.

24. The apparatus of claim 22, wherein the at least one module is further configured to determine the subset of common resources based upon the feedback information.

25. The apparatus of claim 24, wherein the at least one module is further configured to send an indication of the subset of common resources to the at least one controlled cell.

26. The apparatus of claim 22, wherein the power level is determined based upon performance criteria for user equipment devices determined to have received interference from the at least one non-controlled cell that is greater than the predetermined threshold.

27. The apparatus of claim 22, wherein the subset of common resources is determined based upon performance criteria for user equipment devices determined to have received interference from the at least one non-controlled cell that is greater than the predetermined threshold.

28. The apparatus of claim 22, wherein determining the power level for the subset of common resources includes determining a candidate power level for each of a plurality of signal-to-interference-plus-noise ratio (SINR) threshold values, and selecting an optimal SINR threshold value and corresponding power level from among the plurality of SINR threshold values and corresponding power levels using a predetermined selection criterion.

\* \* \* \* \*